United States Patent
Lohman et al.

(10) Patent No.: US 11,465,758 B2
(45) Date of Patent: Oct. 11, 2022

(54) METHOD AND APPARATUS FOR AIRCRAFT ANTI-ICING

(71) Applicant: ROHR, INC., Chula Vista, CA (US)

(72) Inventors: Sarah Lohman, San Diego, CA (US); Steven M Kestler, San Diego, CA (US); Manuel Muñoz, Mexicali (MX); Jay Francisco, Chula Vista, CA (US); Vijay V Pujar, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 598 days.

(21) Appl. No.: 16/399,639

(22) Filed: Apr. 30, 2019

(65) Prior Publication Data

US 2020/0346766 A1    Nov. 5, 2020

(51) Int. Cl.
*B64D 15/04*    (2006.01)
*B64D 33/02*    (2006.01)

(52) U.S. Cl.
CPC .......... *B64D 15/04* (2013.01); *B64D 33/02* (2013.01); *B64D 2033/0233* (2013.01)

(58) Field of Classification Search
CPC .. B64D 15/04; B64D 2033/2033; F02C 7/047
USPC .......................................................... 297/14
See application file for complete search history.

(56) References Cited

U.S. PATENT DOCUMENTS

| | | | |
|---|---|---|---|
| 2,488,467 A | 11/1949 | Delisio | |
| 3,749,336 A | 7/1973 | Christensen et al. | |
| 3,936,013 A * | 2/1976 | Yuan | B64C 23/065 244/199.3 |
| 4,351,150 A | 9/1982 | Schulze | |
| 4,688,745 A | 8/1987 | Rosenthal | |
| 5,649,370 A | 7/1997 | Russo | |
| 6,267,328 B1 | 7/2001 | Vest | |
| 6,354,538 B1 * | 3/2002 | Chilukuri | B64D 15/04 244/134 B |
| 6,427,434 B2 * | 8/2002 | Porte | F02C 7/047 60/39.093 |
| 8,757,547 B2 | 6/2014 | Porte et al. | |
| 9,927,136 B2 | 3/2018 | Staniforth | |
| 9,950,799 B2 | 4/2018 | Anderson et al. | |
| 10,138,811 B2 | 11/2018 | Gally et al. | |
| 10,167,085 B2 * | 1/2019 | Wiberg | B64D 27/16 |
| 10,167,086 B2 | 1/2019 | Newman et al. | |
| 10,513,978 B2 * | 12/2019 | Tiwari | F02C 7/047 |

(Continued)

FOREIGN PATENT DOCUMENTS

| | | |
|---|---|---|
| EP | 2204320 | 7/2010 |
| EP | 2918809 | 9/2015 |

(Continued)

OTHER PUBLICATIONS

European Patent Office, European Search Report dated Jun. 3, 2020 in Application No. 19216725.2.

(Continued)

*Primary Examiner* — Richard R. Green
*Assistant Examiner* — Madison Elizabeth Dittner
(74) *Attorney, Agent, or Firm* — Snell & Wilmer L.L.P.

(57) ABSTRACT

An apparatus for aircraft anti-icing includes a nozzle body, at least one nozzle extending from the nozzle body, and at least one vane disposed in at least one of the nozzle(s), the at least one vane configured to impart rotational movement of a hot gas moving through the nozzle(s).

19 Claims, 5 Drawing Sheets

(56) References Cited

U.S. PATENT DOCUMENTS

| | | |
|---|---|---|
| 11,117,669 B2* | 9/2021 | Fletcher ............ B64D 13/08 |
| 2002/0148929 A1 | 10/2002 | Andre |
| 2002/0179773 A1 | 12/2002 | Breer et al. |
| 2003/0079366 A1 | 5/2003 | Chang |
| 2004/0083620 A1 | 5/2004 | McCambridge et al. |
| 2006/0059891 A1 | 3/2006 | Sheoran |
| 2010/0150699 A1 | 6/2010 | Nicolas et al. |
| 2010/0226764 A1 | 9/2010 | Gammack |
| 2010/0226787 A1 | 9/2010 | Gammack |
| 2011/0004993 A1 | 1/2011 | Frei |
| 2011/0226284 A1 | 9/2011 | Taylor |
| 2011/0277335 A1 | 11/2011 | Prehodka |
| 2012/0260516 A1 | 10/2012 | Han et al. |
| 2013/0111777 A1 | 5/2013 | Jeong |
| 2013/0327012 A1 | 12/2013 | Mahabub et al. |
| 2015/0024674 A1 | 1/2015 | McGregor |
| 2015/0086333 A1 | 3/2015 | Schnoebelen et al. |
| 2015/0198061 A1 | 7/2015 | Johnson |
| 2015/0260099 A1 | 9/2015 | Gally et al. |
| 2015/0291284 A1 | 10/2015 | Victor et al. |
| 2016/0017751 A1 | 1/2016 | Caruel |
| 2016/0257413 A1 | 9/2016 | Newman et al. |
| 2017/0057643 A1 | 3/2017 | Frank et al. |
| 2017/0058772 A1 | 3/2017 | Frank et al. |
| 2017/0136394 A1* | 5/2017 | Zedelmair ............ F01M 13/04 |
| 2017/0166313 A1 | 6/2017 | Saeed |
| 2018/0194485 A1 | 7/2018 | Chilukuri |
| 2019/0127065 A1 | 5/2019 | Capunay |
| 2019/0309683 A1 | 10/2019 | Mackin |
| 2020/0140098 A1 | 5/2020 | Radhakrishnan |
| 2020/0346766 A1 | 11/2020 | Lohman |
| 2020/0346767 A1 | 11/2020 | Pujar |

FOREIGN PATENT DOCUMENTS

| | | |
|---|---|---|
| FR | 2953254 | 6/2011 |
| KR | 20140017453 | 2/2014 |
| WO | 9810677 | 3/1998 |
| WO | 2015059489 | 4/2015 |

OTHER PUBLICATIONS

European Patent Office, European Search Report dated Jun. 3, 2020 in Application No. 19216738.5.

European Patent Office, European Search Report dated May 18, 2020 in Application No. 19216718.7.

USPTO, Non-Final Office Action dated Apr. 21, 2021 in U.S. Appl. No. 16/399,561.

USPTO, Notice of Allowance dated Jul. 28, 2021 in U.S. Appl. No. 16/399,561.

USPTO, Non-Final Office Action dated May 4, 2021 in U.S. Appl. No. 16/399,699.

USPTO, Final Office Action dated Aug. 25, 2021 in U.S. Appl. No. 16/399,699.

USPTO, Notice of Allowance dated Nov. 12, 2021 in U.S. Appl. No. 16/399,699.

European Patent Office, European Office Action dated Sep. 23, 2021 in Application No. 19216725.2.

European Patent Office, European Office Action dated Sep. 23, 2021 in Application No. 19216718.7.

* cited by examiner

METHOD AND APPARATUS FOR AIRCRAFT ANTI-ICING

FIELD

The present disclosure relates to anti-icing systems for aircraft jet engine propulsion systems, and more particularly to nozzles for anti-icing systems.

BACKGROUND

The formation of ice on aircraft wings, propellers, air inlets of engines, etc. adds considerable weight, and changes the airfoil or inlet configuration, which may make the aircraft more difficult to fly and in some cases has caused loss of aircraft. In the case of jet aircraft, large pieces of ice breaking loose from the leading edge of an engine inlet housing can damage rotating turbine blades or other internal engine components and cause engine failure.

Typical anti-ice techniques include the ducting of hot gases into a housing adjacent to the likely icing area. Current techniques to solve this problem generally fall into one of two types of systems: Impingement style ring systems or swirl nozzle systems. In each case, the hot gas conduits simply dump hot gases into a housing, such as the leading edge of a jet engine housing or a wing leading edge. While often useful, these systems may not be fully effective due to the low quantity of hot gases introduced relative to the mass of air in the housing, the heating effect tending to be limited to the region near the hot gas introduction point, and the complexity of the hot gas duct system.

SUMMARY

An apparatus for aircraft anti-icing is disclosed, the apparatus comprising a nozzle body, a first nozzle extending from the nozzle body, and a first vane disposed in the first nozzle, the first vane configured to impart rotational movement of a hot gas moving through the first nozzle.

In various embodiments, the first nozzle comprises an annular flange extending from the nozzle body.

In various embodiments, the apparatus further comprises a second vane disposed in the first nozzle, the second vane configured to impart rotational movement of the hot gas moving through the first nozzle.

In various embodiments, the apparatus further comprises a first beam disposed at an exit plane of the first nozzle, the first beam bifurcating the first nozzle, and the first vane extending from the first beam.

In various embodiments, the apparatus further comprises a second beam disposed at an entrance plane of the first nozzle, the second beam bifurcating the first nozzle, and the first vane extending from the second beam.

In various embodiments, the first nozzle is tapered.

In various embodiments, a centerline axis of the nozzle body is orthogonal with respect to a centerline axis of the first nozzle.

In various embodiments, the first vane comprises a helical geometry.

In various embodiments, the apparatus further comprises a second nozzle extending from the nozzle body.

In various embodiments, the nozzle body is configured to receive the flow of hot gas from a compression stage of an engine.

In various embodiments, the apparatus is configured to provide at least a portion of the flow of hot gas to a leading edge housing of an aircraft component.

In various embodiments, the vane divides a first flow path through the first nozzle from a second flow path through the first nozzle.

An aircraft anti-icing system is disclosed, comprising a source of a hot gas, a housing, a conduit configured to carry the hot gas from the source to the housing, and an outlet nozzle coupled to the conduit. The outlet nozzle comprises a nozzle body, a first nozzle extending from the nozzle body, and a first vane disposed in the first nozzle, the first vane configured to impart rotational movement of the hot gas moving through the first nozzle.

In various embodiments, the aircraft anti-icing system further comprises a port for exhausting air from the housing, wherein the outlet nozzle is configured to increase a speed of the hot gas exiting the first nozzle, and the hot gas mixes with air from the housing after the hot gas exits the first nozzle.

In various embodiments, the first nozzle comprises an annular flange extending from the nozzle body.

In various embodiments, the annular flange is tapered.

In various embodiments, the aircraft anti-icing system further comprises a first beam disposed at an exit plane of the first nozzle, the first beam bifurcating the first nozzle, and the first vane extending from the first beam, and a second beam disposed at an inlet plane of the first nozzle, the second beam bifurcating the first nozzle, and the first vane extending from the second beam.

In various embodiments, the first vane comprises a helix geometry.

A method for preventing formation of ice is disclosed, the method comprising receiving, at an outlet nozzle, a hot gas from a compression stage of an engine, and providing, via the outlet nozzle, the hot gas received from the compression stage to an internal volume of a leading edge housing, wherein the outlet nozzle provides the hot gas based on a flow pattern, wherein the flow pattern is determined based, at least in part, on a geometry of the outlet nozzle that has a nozzle body, a first nozzle extending from the nozzle body, and a first vane disposed in the first nozzle, the first vane configured to impart rotational movement of the hot gas moving through the first nozzle.

In various embodiments, the method further comprises exhausting the hot gas from the housing.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading and/or crosshatching lines may be used throughout the figures to denote different parts, but not necessarily to denote the same or different materials.

An anti-icing system of the present disclosure may provide an improved swirling rotational anti-icing system for a leading edge housing, such as the nose cowl of a transport aircraft jet engine, which enhances the mixing of injected hot, high pressure gas with the larger mass of air within the leading edge housing. An anti-icing system of the present disclosure may further improve the mixing of hot, high pressure gas with the mass of air within the leading edge housing and thereby materially reduce any tendency for the injection of such hot, high pressure gas to create an area of elevated temperature in the leading edge housing at a position downstream of the injection of such hot gas under severe operating condition.

Various embodiments of the present disclosure may is to enhance the circumference uniformity of nose lip temperature and nose lip heat rejection to improve the anti-icing efficiency and to prevent ice accumulation on the exterior of the nose lip upstream of the point of hot gas injection.

Figure 1:
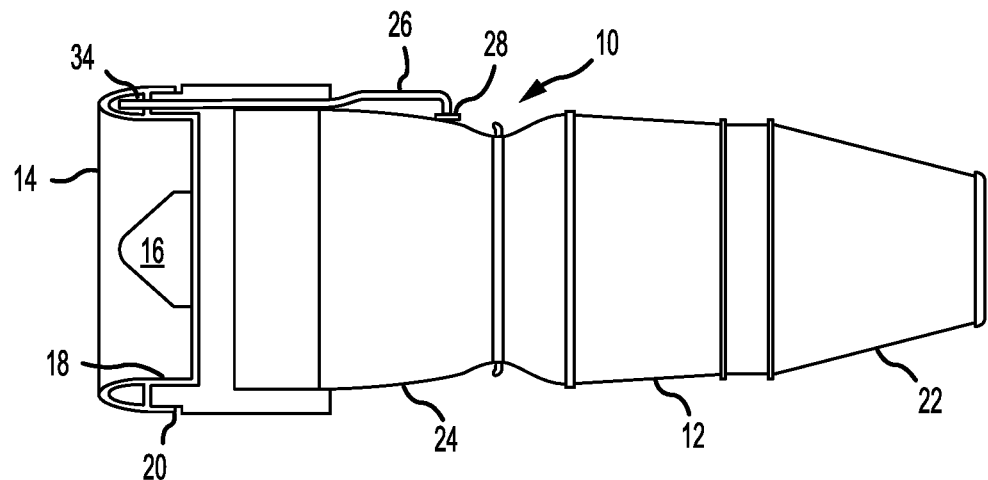
FIG. 1 illustrates a schematic representation of a typical jet turbine engine, in accordance with various embodiments.

With reference to FIG. 1, there is seen a schematic representation of a jet turbine engine 10 of the type suitable for aircraft propulsion. The turbine engine 10 is housed within a central housing 12. Air enters the engine 10 through an air inlet section 20, between the spinner 16 of the engine and the nose lip or annular single skin housing 14 which constitutes the forward most section of the air inlet 20 of the engine nacelle, though it is noted that certain components have been omitted from the figure for simplicity. Engine thrust is produced by mixing incoming air and fuel to form a combustible mixture within the central housing 12 and passing the hot, high pressure exhaust gases through exhaust outlet 22 and out the rear of the engine.

In flight, ice may tend to form on the nose lip 14 (in addition to other leading edge housing aircraft components omitted for simplicity). The ice changes the geometry of the inlet area 18 between the nose lip 14 and the spinner 16, adversely affecting the quantity, flow path and quality of incoming air. Also, pieces of ice may periodically break free from these components and enter the engine, damaging rotor blades and other internal engine components.

Figure 2:
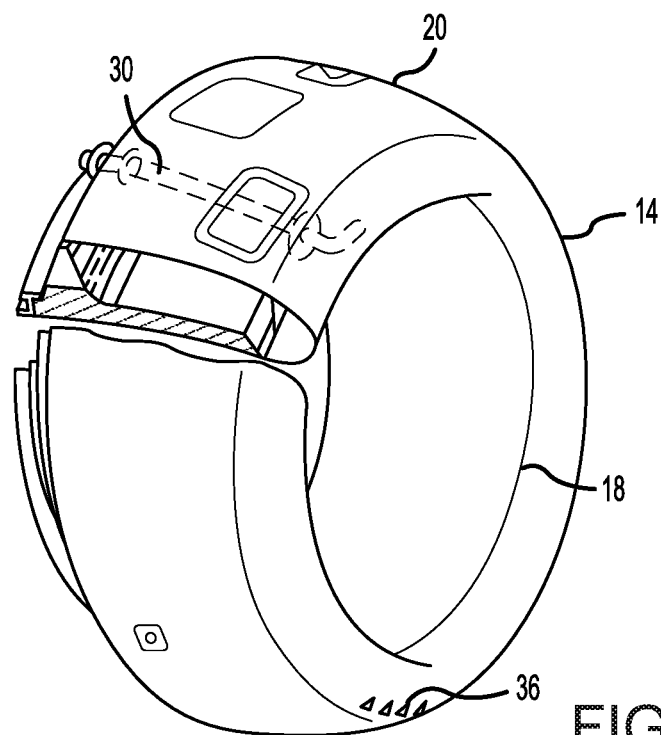
FIG. 2 illustrates a schematic view of a jet engine inlet, in accordance with various embodiments.
Figure 3:
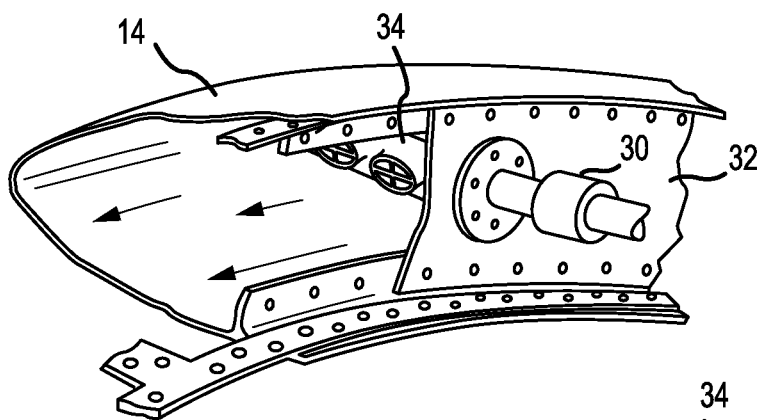
FIG. 3 illustrates a perspective view, partially in section, of an outlet nozzle installed in a leading edge housing, in accordance with various embodiments.

With combined reference to FIG. 1, FIG. 2, and FIG. 3, within the compressor section 24 of the jet engine 10 there is a region containing hot gases. A suitable conduit 26 or tube is connected at a first end 28 to that hot region. In various embodiments, the hot region is the environmental bleed air manifold although in other embodiments the hot region may be any other hot air source such as the compressor discharge bleed air manifold. The other end 30 penetrates a bulkhead 32 that substantially closes the nose lip 14 to form the D-duct to enclose a quantity of air with the annular space created by such bulkhead 32 and the nose lip 14.

The conduit 26 carrying the hot, high pressure gas from the compressor section of a jet engine 10 extends through the bulkhead 32 that closes off the annular nose lip 14 of the inlet 18 to create an annular chamber filled with air. The conduit 26 has an outlet nozzle 34 connected to its outlet end. The outlet nozzle 34 directs the hot gas around the circumference of the annular chamber.

Outlet nozzle 34 may be made from a metallic material suitable to withstand high temperature gasses, for example from compressor section 24 of the jet engine 10. In various embodiments, outlet nozzle 34 may comprise one of a steel, a stainless steel, a tungsten carbide, a titanium, a titanium alloy, a nickel, nickel alloy, a nickel steel (e.g., an austenitic nickel-chromium-based alloy such as that available under the trade name INCONEL), or any other material suitable to withstand high temperature gasses from compressor section 24.

In various embodiments, outlet nozzle 34 is additively manufactured. As used herein, the term "additive manufacturing" encompasses any method or process whereby a three-dimensional object is produced by creation of a substrate or material to an object, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication or joining of previously formed objects.

A variety of additive manufacturing technologies are commercially available. Such technologies include, for example, fused deposition modeling, polyjet3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure. In this regard, outlet nozzle 34 is a monolithic structure, in accordance with various embodiments. In various embodiments, outlet nozzle 34 is a combination of monolithic sub-structures that are joined together, for example via welding, fasteners, or a threaded connection, among others.

In operation, outlet nozzle 34 may turn the flow of hot gas substantially 90 degrees so that the outlet of outlet nozzle 34 directs the flow of hot gas approximately tangent to the centerline of the annular nose lip 14. In various embodiments, the outlet of outlet nozzle 34 directs the flow of hot gas in a direction more or less than tangent to the centerline of the annular nose lip 14.

It will be recognized that the injection of the hot gas stream into the housing air will cause the entrained mass of air to rotate within the nose lip 14 in a rotational direction. Also, as seen in FIG. 2, as the mass of entrained air rotates within the nose lip 14 a suitable exhaust means, shown as suitably sized holes 36 formed in an outboard position of the nose lip 14, permit a portion of such entrained air to escape the nose lip 14 equal to the mass flow rate of hot gas being injected into the nose lip 14 to maintain an equilibrium of flow. In various embodiments holes 36 may be located in other areas including but not limited to the rear of housing 14.

It will be recognized that as the hot gas is emitted from the nozzle 34 the hot gases rapidly mix with the ambient air in the nose lip 14, to rapidly reach a temperature intermediate between the entering hot gas temperature and that of the ambient air. The temperature of the air within the nose lip 14 will continue to rise until an equilibrium condition is reached. As the temperature in the nose lip 14 rises higher amounts of energy will be lost through the skin in the form of conduction and will be lost in the air leaving the nose lip 14. When the amount of energy leaving the nose lips 14 equals the amount entering then the temperature will hold steady at a maximum temperature. With the nozzle 34 and the enhanced mixing of the hot, high pressure gas and the air contained within the nose lip 14, any tendency of the rotating heated air mass to generate a localized area of elevated temperature in the skin of the nose lip 14 will be materially reduced.

In various embodiments, the conduit 30 carries hot, high pressure gas from the jet engine 10 to a leading edge housing of other aircraft components, such as a wing for example. In this regard, outlet nozzle 34 may be used for anti-ice systems associated with other aircraft components without departing from the scope or spirit of the present disclosure. Outlet nozzle 34 may be configured to increase a speed of the hot gas exiting the outlet nozzle 34. 210.

Figure 4A:
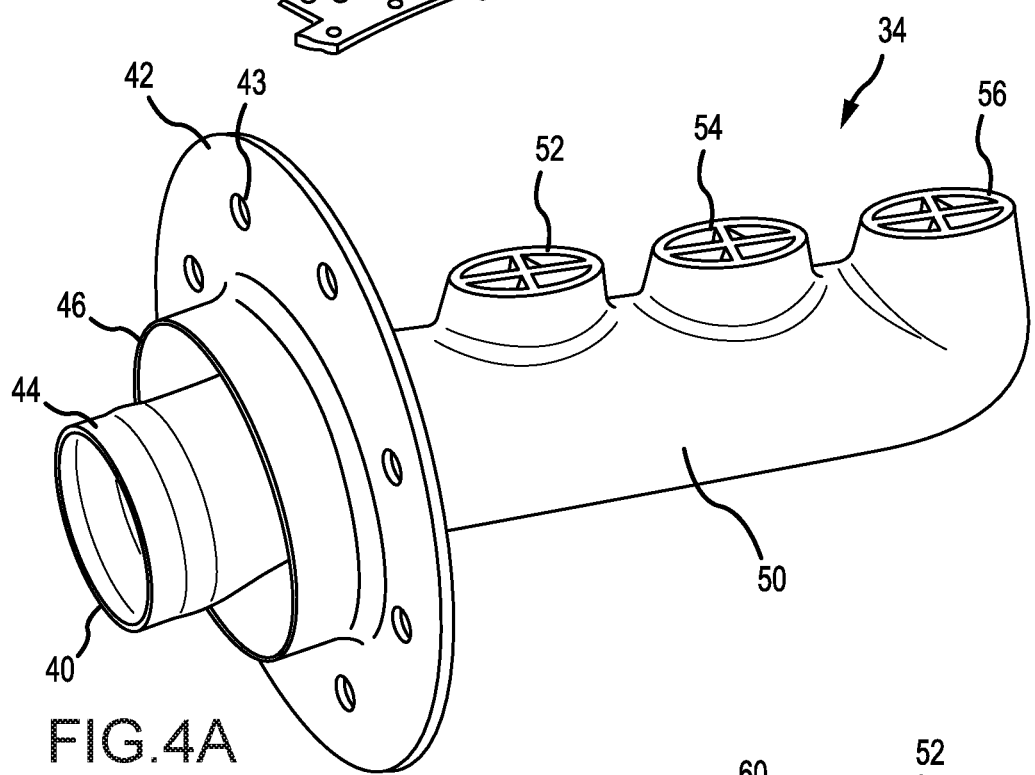
FIG. 4A illustrates a perspective view of an outlet nozzle having a plurality of nozzles extending from a nozzle body, in accordance with various embodiments.
Figure 4B:
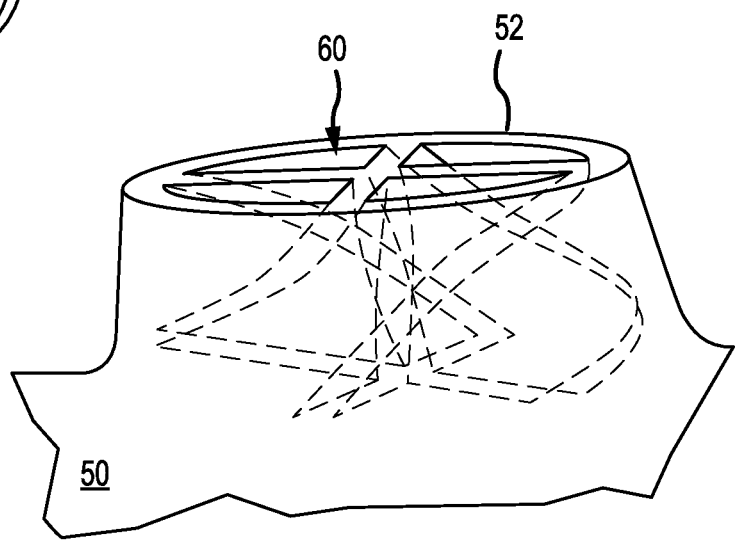
FIG. 4B illustrates an enlarged view of a nozzle having internal vanes of FIG. 4A, in accordance with various embodiments.

With combined reference to FIG. 4A and FIG. 4B, outlet nozzle 34 is illustrated in accordance with various embodiments. Thus, an anti-ice nozzle may include outlet nozzle 34 which may be configured to receive heated gases from a compression stage of an engine nacelle and further configured to provide the gases to an internal volume of a leading edge housing mounted to the leading edge of the engine nacelle. In various embodiments, outlet nozzle 34 provides the hot gas based on a flow pattern, wherein the flow pattern is determined based, at least in part, on a geometry of the outlet nozzle 34, as described herein. In various embodiments, outlet nozzle 34 comprises a nozzle body 50 comprising an inlet 40 whereby the hot gas enters nozzle body 50 and one or more nozzles, such as first nozzle 52, second nozzle 54, and third nozzle 56, whereby the hot gas exits nozzle body 50. In various embodiments, outlet nozzle 34 may comprise a collar 42 whereby nozzle body 50 is secured to bulkhead 32. For example, collar 42 may include one or more holes, such as hole 43, which match holes in an internal bulkhead of the leading edge housing, and one or more fasteners, such as nuts and bolts, may be used to fasten collar 42, as well as nozzle body 50, to the internal bulkhead. In various embodiments, the holes and fasteners may control or determine the positional tolerances of nozzles, such as nozzle body 50, that may be included in the leading edge housing. The inlet 40 may comprise one or more flanges, such as first flange 44, configured to couple nozzle body 50 to a source of the gases. For example, first flange 44 may be configured to be coupled to a pipe, tube, or conduit (e.g., conduit 30 of FIG. 3) that may be included in a manifold system coupled to a compression stage of the engine. In various embodiments, a second flange 46 may be configured to provide further coupling with the pipe or conduit and/or may provide additional structural support for the coupling or connection between nozzle body 50 and the manifold system coupled to the compression stage. Furthermore, second flange 46 may provide structural support for coupling nozzle body 50 to bulkhead 32.

In various embodiments, first nozzle 52, second nozzle 54, and third nozzle 56 may be oriented such that the direction of flows generated by first nozzle 52, second nozzle 54, and third nozzle 56 are substantially parallel to the internal bulkhead that may be attached to collar 42. In various embodiments, the orientation of the nozzles may form about a 90 degree angle with a centerline of the nozzle body 50. Stated differently, the centerline axes of first nozzle 52, second nozzle 54, and/or third nozzle 56 may be orthogonal with respect to the centerline axis of nozzle body 50.

In various embodiments, first nozzle 52 may be included in a first portion of nozzle body 50 and may be a flanged opening that provides a first flow path through which a first portion of gases received from the manifold system associated with the compression stage may be released into the internal volume of the leading edge housing of the engine nacelle.

In various embodiments, the nozzles may include one or more internal vanes 60 for enhancing the mixing efficiency of outlet nozzle 34 to minimize a temperature of a hot spot associated with the leading edge housing that includes nozzle body 50.

Figure 5A:
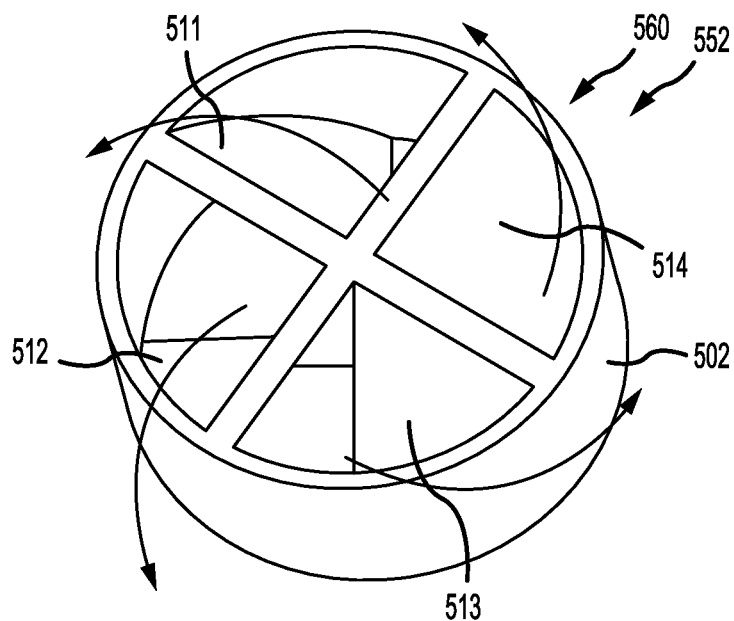
FIG. 5A and FIG. 5B illustrate a perspective view of a nozzle having internal vanes, in accordance with various embodiments.
Figure 5B:
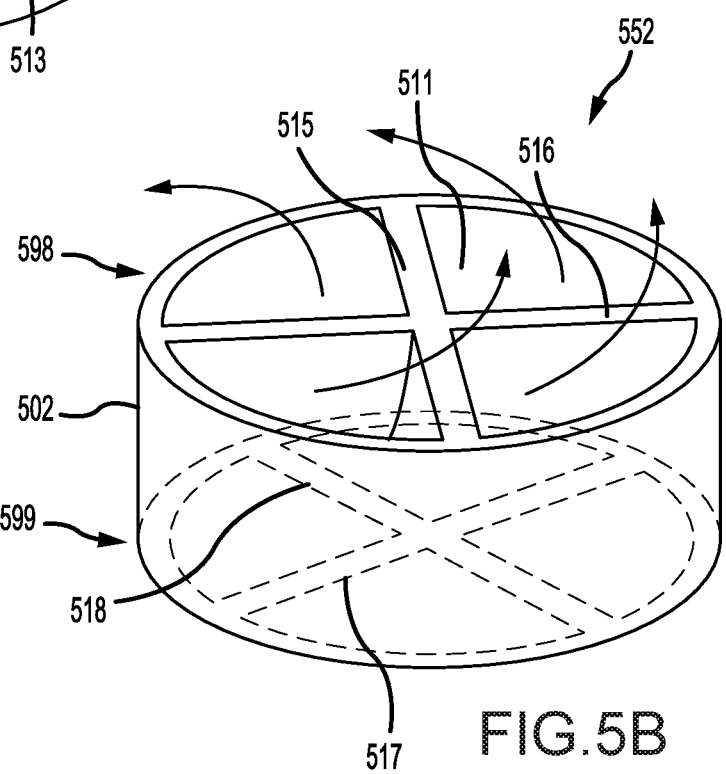

With reference to FIG. 5A and FIG. 5B, a nozzle 552 is illustrated, in accordance with various embodiments. An outlet nozzle may include nozzle 552 which may be configured to impart a rotational movement of the gas in a clockwise or counter clockwise direction and then eject the gas out the nozzle 552 into the leading edge housing. Nozzle 552 may comprise an annular flange 502 and a plurality of vanes 560, such as first vane 511, second vane 512, third vane 513, and fourth vane 514. In various embodiments, each of the plurality of vanes 560 are formed in a helical shape. The pitch angle of the vanes may also increase or decrease in order to vary the swirl flow velocity.

In various embodiments, a first beam 515 may bisect the annular flange 502 at the exit plane 598 of annular flange 502. Stated differently, first beam 515 may span the inner diameter of annular flange 502, intersecting the centerline axis of annular flange 502. Similarly, a second beam 517 may bisect the annular flange 502 at the entrance plane 599 of annular flange 502. A vane, such as first vane 511, may extend from first beam 515 at a first end thereof, and extend from second beam 517 at a second, opposite end thereof. In this manner, the first vane is angled to impart a rotational movement in a clockwise or counter clockwise direction of the hot gas exiting nozzle 552. Similarly, a third beam 516 may bisect the annular flange 502 at the exit plane 598 of annular flange 502 and a fourth beam 518 may bisect the annular flange 502 at the entrance plane 599 of annular flange 502. The third beam 516 may intersect first beam 515 at the centerline axis of annular flange 502. The fourth beam 518 may intersect second beam 517 at the centerline axis of annular flange 502.

Figure 6:
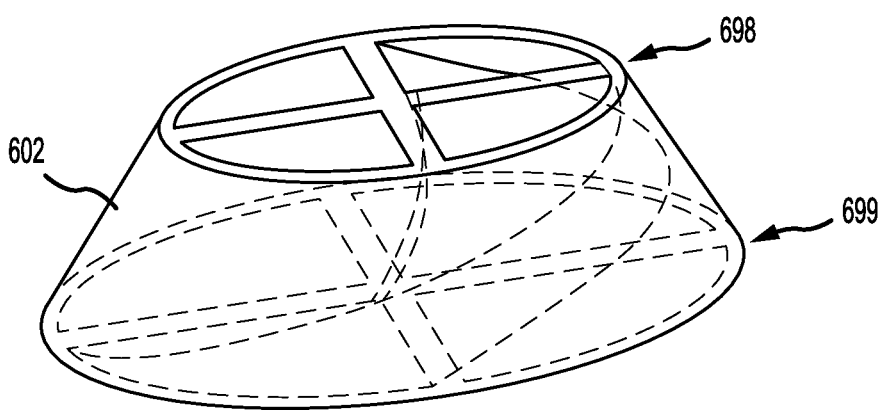
FIG. 6 illustrates a perspective view of a tapered nozzle, in accordance with various embodiments.

With reference to FIG. 6, a nozzle 652 is illustrated, in accordance with various embodiments. An outlet nozzle may include nozzle 652 which may be configured to impart a rotational movement of the gas and then eject the gas out the nozzle 652 into the leading edge housing. In various embodiments, nozzle 652 comprises a tapered geometry such that the area of nozzle 652 at the entrance plane 699 is greater than the area of nozzle 652 at the exit plane 698. The annular flange 602 may comprise a truncated cone, in accordance with various embodiments. In this manner, hot gas is accelerated through nozzle 652.

Figure 7A:
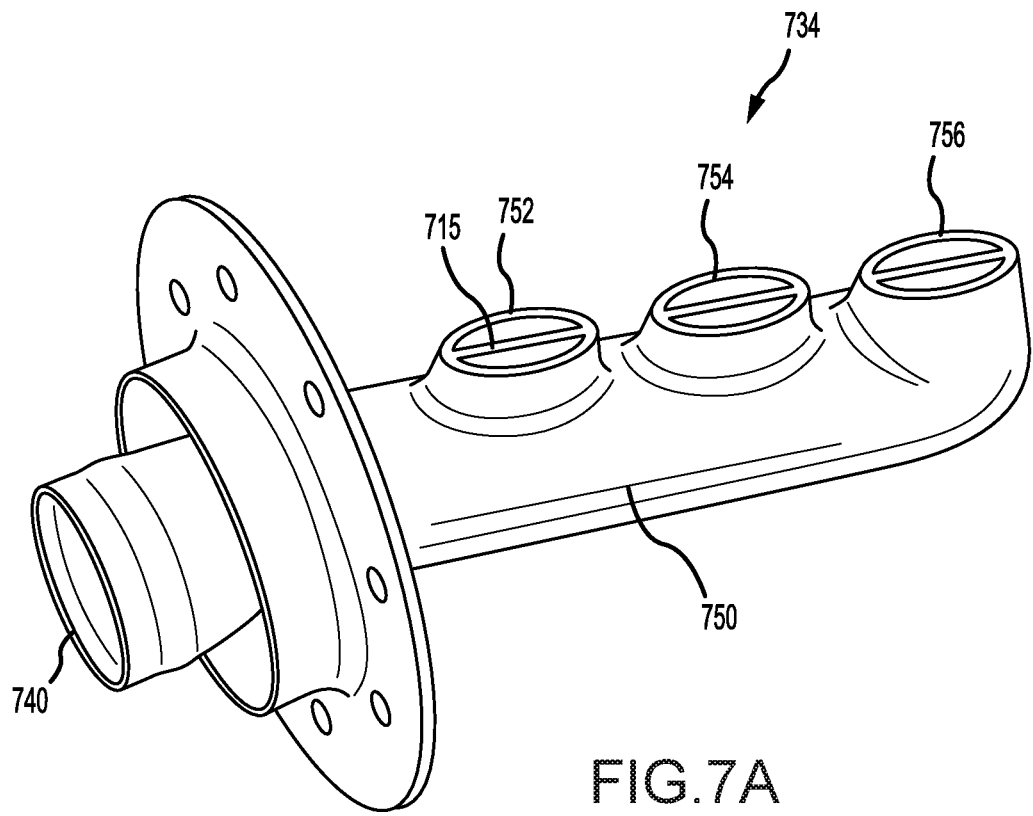
FIG. 7A illustrates a perspective view of an outlet nozzle having a plurality of nozzles extending from a nozzle body, in accordance with various embodiments.

With reference to FIG. 7A, an outlet nozzle 734 is illustrated in accordance with various embodiments. Thus, an anti-ice nozzle may include outlet nozzle 734 which may be configured to receive heated gases from a compression stage of an engine nacelle and further configured to provide the gases to an internal volume of a leading edge housing mounted to the leading edge of the engine nacelle. In various embodiments, outlet nozzle 734 comprises a nozzle body 750 comprising an inlet 740 whereby the hot gas enters nozzle body 750 and one or more nozzles, such as first nozzle 752, second nozzle 754, and third nozzle 756, whereby the hot gas exits nozzle body 750. In various embodiments, outlet nozzle 734 is similar to outlet nozzle 34 of FIG. 4A.

In various embodiments, nozzle 752 is configured to impart a rotational movement of the gas and then eject the gas out the nozzle 752 into the leading edge housing. Nozzle 752 may comprise an annular flange 702 and a helical vane 711 bisecting annular flange 702. Stated differently, helical vane 711 may divide at least partially define two separate flow paths through annular flange 702. Helical vane 711 may comprise a first beam 715 bisecting the annular flange 702 at the exit plane 798 of annular flange 702. Stated differently, first beam 715 may span the inner diameter of annular flange 702, intersecting the centerline axis of annular flange 702. Similarly, helical vane 711 may comprise a second beam 717 bisecting the annular flange 702 at the entrance plane 799 of annular flange 702. Helical vane 711 may extend from first beam 715 at a first end thereof, to second beam 717 at a second, opposite end thereof. In various embodiments, the first beam 715 is oriented parallel with respect to a centerline axis of nozzle body 750 (see FIG. 7A). In various embodiments, the first beam 715 is oriented at a non-parallel angle, such as orthogonal for example, with respect to a centerline axis of nozzle body 750, such as illustrated in FIG. 8A and FIG. 8B.

Figure 7B:
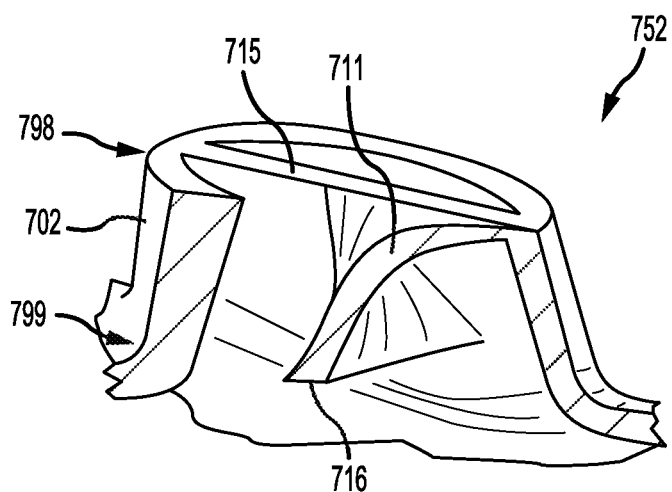
FIG. 7B illustrates an enlarged view of a nozzle having an internal helical vane of FIG. 7A, in accordance with various embodiments.
Figure 8A:
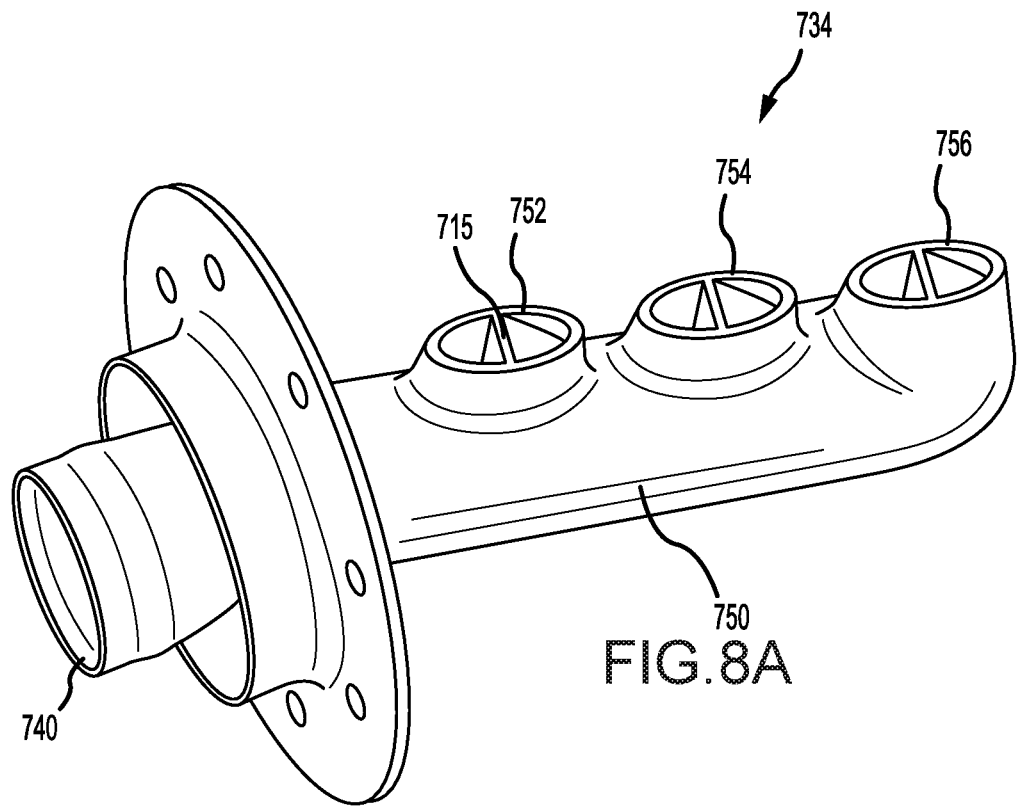
FIG. 8A illustrates a perspective view of an outlet nozzle having a plurality of nozzles extending from a nozzle body, in accordance with various embodiments.
Figure 8B:
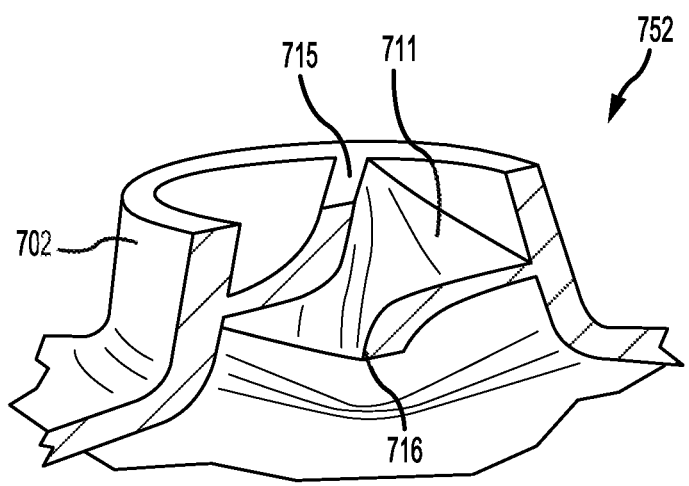
FIG. 8B illustrates an enlarged view of a nozzle having an internal helical vane of FIG. 8A, in accordance with various embodiments.

With respect to FIG. 8A and FIG. 8B, elements with like element numbering, as depicted in FIG. 7A and FIG. 7B, are intended to be the same and will not necessarily be repeated for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An apparatus for aircraft anti-icing, the apparatus comprising:
    a nozzle body;
    a first nozzle extending from the nozzle body, wherein the first nozzle is configured to be fluidly connected with only a single fluid source comprising a source of hot gas such that a gas exiting the first nozzle is comprised entirely of a hot gas received from the single fluid source; and
    a first vane disposed in the first nozzle, the first vane configured to impart rotational movement of the hot gas moving through the first nozzle, wherein the first vane comprises helical geometry.

2. The apparatus of claim 1, wherein the first nozzle comprises an annular flange extending from the nozzle body.

3. The apparatus of claim 1, further comprising a second vane disposed in the first nozzle, the second vane configured to impart rotational movement of the hot gas moving through the first nozzle.

4. The apparatus of claim 1, further comprising a first beam disposed at an exit plane of the first nozzle, the first beam bifurcating the first nozzle, and the first vane extending from the first beam.

5. The apparatus of claim 4, further comprising a second beam disposed at an entrance plane of the first nozzle, the second beam bifurcating the first nozzle, and the first vane extending from the second beam.

6. The apparatus of claim 1, wherein the first nozzle is tapered.

7. The apparatus of claim 1, wherein a centerline axis of the nozzle body is orthogonal with respect to a centerline axis of the first nozzle.

8. The apparatus of claim 1, further comprising a second nozzle extending from the nozzle body.

9. The apparatus of claim 1, wherein the nozzle body is configured to receive the flow of hot gas from a compression stage of an engine.

10. The apparatus of claim 1, wherein the apparatus is configured to provide at least a portion of the flow of hot gas to a leading edge housing of an aircraft component.

11. The apparatus of claim 1, wherein the first vane divides a first flow path through the first nozzle from a second flow path through the first nozzle.

12. The apparatus of claim 1, wherein the first vane is disposed internal to the first nozzle, and the first vane is configured to impart rotational movement of a hot gas ejected from the first nozzle.

13. The apparatus of claim 1, wherein the first vane is disposed in a flow path of the hot gas.

14. An aircraft anti-icing system comprising:
    a source of a hot gas;
    a housing;
    a conduit configured to carry the hot gas from the source to the housing; an outlet nozzle coupled to the conduit, the outlet nozzle comprising:
    a nozzle body;
    a first nozzle extending from the nozzle body, wherein the first nozzle is fluidly connected with only a single fluid source comprising the source of the hot gas such that a gas exiting the first nozzle is comprised entirely of a hot gas received from the single fluid source; and
    a first vane disposed in the first nozzle, the first vane configured to impart rotational movement of the hot gas moving through the first nozzle, wherein the first vane comprises helical geometry.

15. The aircraft anti-icing system of claim 14, further comprising a port for exhausting air from the housing, wherein the outlet nozzle is configured to increase a speed of the hot gas exiting the first nozzle, and the hot gas mixes with air from the housing after the hot gas exits the first nozzle.

16. The aircraft anti-icing system of claim 14, wherein the first nozzle comprises an annular flange extending from the nozzle body.

17. The aircraft anti-icing system of claim 16, wherein the annular flange is tapered.

18. The aircraft anti-icing system of claim 16, further comprising:
    a first beam disposed at an exit plane of the first nozzle, the first beam bifurcating the first nozzle, and the first vane extending from the first beam; and
    a second beam disposed at an inlet plane of the first nozzle, the second beam bifurcating the first nozzle, and the first vane extending from the second beam.

19. The aircraft anti-icing system of claim 16, wherein the first vane comprises at least one of a clockwise helix geometry or a counter clockwise helix geometry.

* * * * *